United States Patent Office.

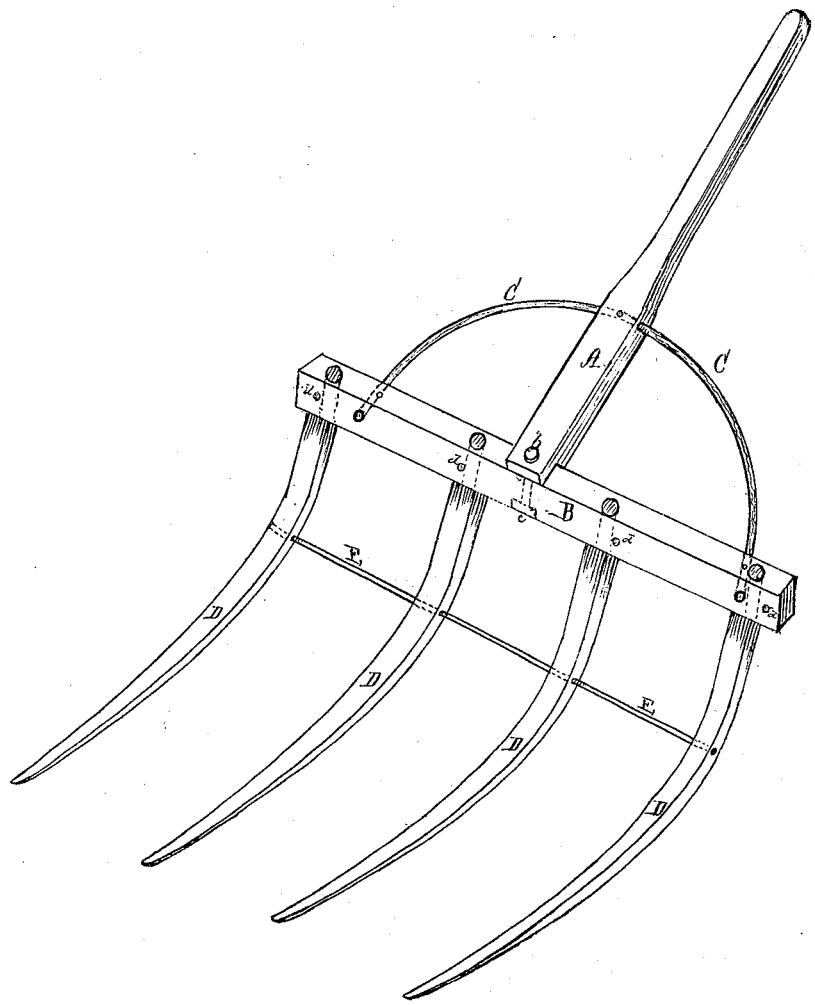

DENNIS P. SHARP, OF ITHACA, NEW YORK.

Letters Patent No. 102,598, dated May 3, 1870.

IMPROVEMENT IN BARLEY OR GAVEL-FORKS.

The Schedule referred to in these Letters Patent and making part of the same.

*To all whom it may concern:*

Be it known that I, DENNIS P. SHARP, of Ithaca, in the county of Tompkins and State of New York, have invented a new and useful Improvement in Gavel or Barley-Forks; and I do hereby declare that the following is a full, clear, and exact description thereof, which will enable others skilled in the art to make and use the same, reference being had to the accompanying drawings forming part of this specification.

This invention relates to a new and useful improvement in gavel or barley-forks; and consists in the peculiar manner of its construction, whereby a better, stronger, and cheaper fork is obtained, as will be hereinafter more fully described.

It has been found by constant use that the teeth or tines of similar forks have a tendency to loosen, and by heavy loads, being forced apart from their proper place on the bar which supports or holds the tines. To avoid and remedy these difficulties my invention consists.

A is the handle of the fork attached to the bar B, and made removable by means of the screw $b$ and nut $c$, in case it becomes broken, or if necessary to substitute handles of different lengths or sizes.

C C are the braces running through the handle A, and fitted at their other ends to the bar B.

B is the bar or cross-piece which holds the tines D D D D, said tines being made to fit firmly to the bar B, and made at their ends in form to fit in holes or sockets in the bar B, and held firmly in place by pins $d\ d\ d\ d$.

This manner of attaching the tines is thought to be much better and making a far more durable tine, and less liable to break or loosen, as is too often the case with forks of ordinary make.

E is the brace-rod or bar running through the tines D D D D, which constitutes one of the principal features of my invention and is intended to keep the tines in their proper position upon the bar B, and also to obviate the difficulty heretofore experienced by the spreading and loosening of the tines.

Having thus fully described my invention,

What I claim and desire to secure by Letters Patent, is—

A fork whose tines are so bent that the points terminate at right angles to the handle and secured on the under side of the head B by pins $e$ and wire brace E, running through the center of said tines at the beginning or center of the curve, all arranged to operate for the purpose specified.

DENNIS P. SHARP.

Witnesses:
 S. L. VOSBURGH,
 C. B. BROWN.